Figure 1:
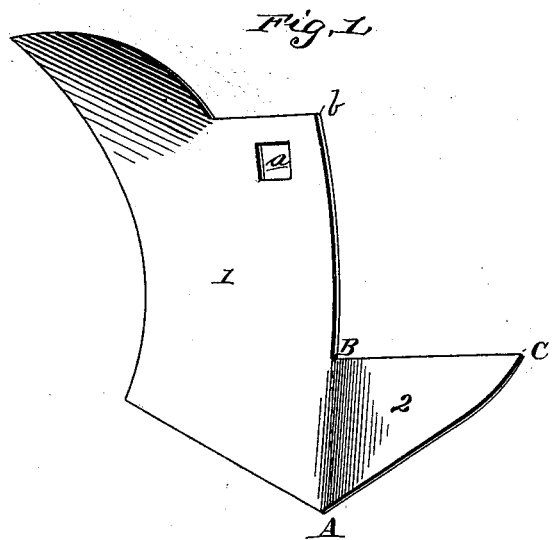

(No Model.)

J. A. URQUHART.
TURNING SHOVEL PLOW.

No. 507,668. Patented Oct. 31, 1893.

Witnesses:
A. W. H. Cdas
W. H. Stinson

Inventor:
Joseph A. Urquhart

UNITED STATES PATENT OFFICE.

JOSEPH A. URQUHART, OF ROSE HILL, ALABAMA.

TURNING SHOVEL-PLOW.

SPECIFICATION forming part of Letters Patent No. 507,668, dated October 31, 1893.

Application filed August 25, 1893. Serial No. 484,081. (No model.)

*To all whom it may concern:*

Be it known that I, JOSEPH A. URQUHART, a citizen of the United States, residing at Rose Hill, in the county of Covington and State of Alabama, have invented a new and useful Improvement in Turning Shovel-Plows, of which the following is a specification.

This invention relates to certain new and useful improvements in turning shovel plows, and it has for its object among others, to provide an improved simple and cheap device of this class that will perform more work in a more satisfactory manner than former constructions, and which will turn the soil lightly to young plants so as not to injure them and at the same time cover any vegetation in the middle, thus cleaning both drill and middle at the same time and saving the labor of one man and horse, and leaving the young crops low so as to better receive the next cultivating.

Other objects and advantages of the invention will hereinafter appear and the novel features thereof will be particularly pointed out in the appended claim.

The invention in this instance resides in the peculiarities of construction of the shovel plow, as more fully hereinafter described, shown in the drawings and defined in the claim.

The invention is clearly illustrated in the accompanying drawings, which with the letters of reference marked thereon form a part of this specification, and in which—

Figure 2:
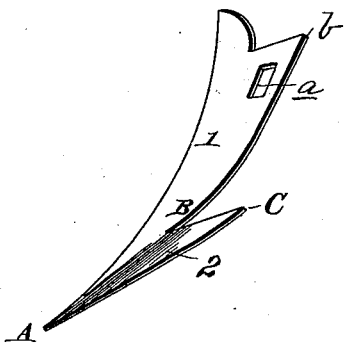

Figure 1 is a face view of my improved plow. Fig. 2, is a perspective view of the same on a smaller scale.

Like letters and numerals of reference indicate like parts in both the figures.

Referring to the details of the drawings by letters and numerals, 1 designates the plow proper having a rectangular opening $a$ whereby it may be secured in place, and 2 is an integral wing, in the shape of a half sweep plow and extending from the point A of the plow to the point C in an inclined direction being wider at the top and its upper edge extending from the point C to B where it merges with the plow proper, the point A being in direct line with the upper point $b$ of the plow proper. As shown, the wing 2 is curved but slightly as shown. The wing adds but little to the weight of the plow, but is an exceedingly useful accessory.

What I claim as new is—

A turning shovel plow comprising a plow proper and an integral wing in substantially the same plane and extending from the point of the plow in an inclined direction upward with a horizontal upper edge merging with the plow, the point A of the plow and the upper point $b$ being in a vertical plane passing through the point of mergence of the plow and the horizontal upper edge of the wing, substantially as shown and described.

JOSEPH A. URQUHART.

Witnesses:
W. H. STINSON,
A. W. H. CARR.